United States Patent [19]

MacDonald

[11] 4,192,052
[45] Mar. 11, 1980

[54] METHOD FOR BONDING A HEAT EXCHANGER FIN TO A TUBE

[75] Inventor: Robert D. MacDonald, Grand Blanc, Mich.

[73] Assignee: E. I. Du Pont de Nemours and Company, Wilmington, Del.

[21] Appl. No.: 817,948

[22] Filed: Jul. 22, 1977

Related U.S. Application Data

[63] Continuation of Ser. No. 660,076, Feb. 23, 1976, abandoned.

[51] Int. Cl.² ............................................. B23P 15/26
[52] U.S. Cl. ............................ 29/157.3 A; 228/183; 228/254; 165/182
[58] Field of Search ................ 29/157.3 A, 157.3 B; 113/118 A, 118 B; 228/254, 183; 165/182

[56] References Cited

U.S. PATENT DOCUMENTS

| | | | |
|---|---|---|---|
| 1,998,664 | 4/1935 | Erbach | 165/182 |
| 2,402,262 | 6/1946 | Sewell | 165/182 |
| 2,427,336 | 9/1947 | Askin | 29/157.3 B |
| 2,553,142 | 5/1951 | McCreary | 165/184 |
| 2,737,370 | 3/1956 | Frisch et al. | 165/182 |
| 3,866,668 | 2/1975 | Doerner | 165/110 |

FOREIGN PATENT DOCUMENTS 869303 11/1941 France ...................... 165/182

*Primary Examiner*—Daniel C. Crane
*Attorney, Agent, or Firm*—Cullen, Sloman, Cantor, Grauer, Scott & Rutherford

[57] ABSTRACT

The fins of a heat exchanger are brazed to the exterior of the fluid-carrying tube by means of a lower melting point cladding on the tube which forms a secure bond between the tube surface and the unconfigured portion of the perimeter of the tube-receiving holes in the fins. The fins have a limited number of narrow tabs doubled back from the edge of each hole to function as longitudinal spacers between adjacent fins.

2 Claims, 4 Drawing Figures

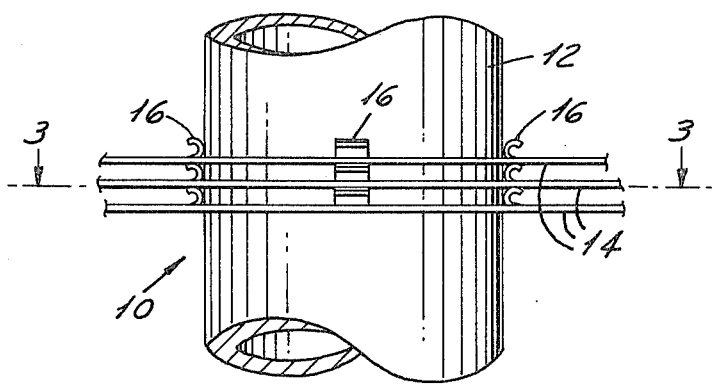
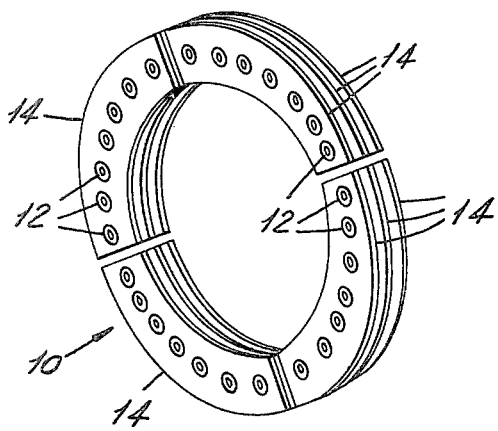
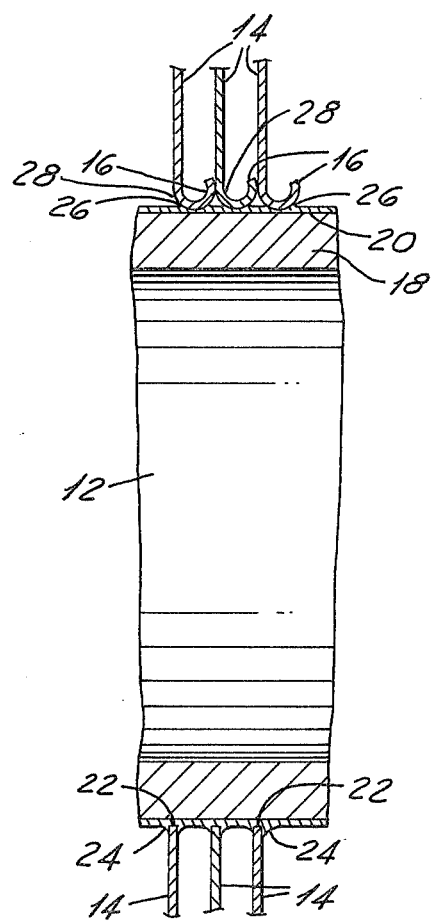
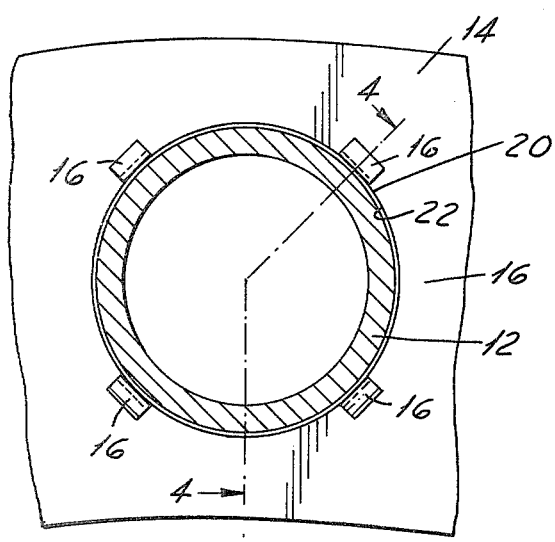

METHOD FOR BONDING A HEAT EXCHANGER FIN TO A TUBE

This is a continuation of application Ser. No. 660,076, filed Feb. 23, 1976, now abandoned.

BACKGROUND OF INVENTION

This invention relates to improvements in the fabrication of heat exchangers of the type wherein a series of very closely spaced fins are to be bonded to a fluid-carrying tube passing through aligned holes in the fins. One environment where heat exchangers of this type may be used is that of the viscous drag type heat exchangers utilized for the condenser and evaporator of a heat pump, such as shown in U.S. Pat. No. 3,866,668.

Two problems arise in the fabrication of such heat exchangers. The first involves provision of means for establishing uniform longitudinal spacing of the fins along the length of the tube. Particularly in a viscous drag air pumping type of rotating heat exchanger, there is an optimum spacing to produce maximum air flow and maximum heat exchanging efficiency. One method which has been employed in the past is the use of an annular flange or collar integral with the fin and surrounding punched tube-receiving hole in the fin. Such collar abuts a portion of the adjacent fin and thereby establishes a minimum spacing therebetween.

These gap-establishing collars have not been entirely successful. It is not possible to turn a sharp right angle flange when punching a hole in the fin, and the required radius of the bend establishes an annular conical depression surrounding the tube on the side of the fin away from the collar. The free end of the collar on the adjacent fin will tend to nest into this depression to a variable degree, destroying the intended close control of the minimum fin spacing.

These collar-like spacers also interfere with the successful brazing of aluminum fins and tubes. A sound braze is essential to provide optimum heat flow across the joint between the tube wall and fin. The collar interferes with proper cleaning of the assembly, such as by ultrasonic bath and vapor degreasing operations, because dirt particles can be trapped in the crevices between the collar and the tube. Also, if the tube is clad with a brazing material, such cladding does not "see" the magnesium which may be placed in the brazing oven (in powder or electrode form) for the purpose of driving out impurities in the clad. Furthermore, the rounded intersection between the collar and the tube prevents the formation of an optimum brazing fillet.

Accordingly, it is the object of this invention to provide an improved construction of the joint between the fin and tube, to achieve reliable control over the fin spacing and to provide a sound brazed joint between the fin and tube for maximum heat conductivity.

BRIEF DESCRIPTION OF THE DRAWINGS

FIG. 1 is a perspective view of a heat exchanger employing the present invention.

FIG. 2 is a fragmentary elevation of a portion of a tube having several fins spaced along its length.

FIG. 3 is a sectional view in the direction of arrows 3—3 of FIG. 2.

FIG. 4 is an enlarged sectional view in the direction of arrows 4—4 of FIG. 3.

DETAILED DESCRIPTION OF THE INVENTION

FIG. 1 is a perspective view of a portion of a typical viscous drag air-pumping type of heat exchanger. Such heat exchanger 10 comprises a series of parallel fluid-carrying tubes 12, each of which passes through a plurality of closely spaced annular fins 14. As best shown in FIGS. 2–4, each tube-receiving hole in a fin is provided with four circumferentially spaced narrow tabs 16. The tube-receiving holes are preferably sized to permit a snug but free insertion of the tube, so that a minimal gap will remain for the subsequent brazing step.

As shown in FIG. 4, tube wall 18 has an outer cladding 20 comprising a material having a melting point slightly below that of both the fin and the main body of the tube. The edge 22 of the tube-receiving hole in the fin is a clean square edge except at the location of the four spaced tabs 16, so that an optimum brazing fillet 24 may be formed by the melting of the cladding material in a brazing oven. For the reasons described above, the brazing fillet 26 formed under the tab 16 may or may not be sound.

The provision of only a few widely spaced and narrow tabs, rather than a full collar, is sufficient to provide the fin spacing function, while at the same time leaving most of the fin hole perimeter as a clean square edge for optimum brazing. Thus, the tube cladding can "see" the heat of the oven (except a small portion which is under tabs 16), to improve melting and bonding.

Furthermore, the narrow tab permits better cleaning of any crevices beneath it, since dirt can be removed both axially and circumferentially from beneath the free edges of the tab.

Because the free tip of each tab 16 is curled or doubled back toward the main portion of the fin, there is no danger that it will tend to nest in the annular depression or recess which exists at the bend radius of the adjacent fin. In this fashion, uniform control of the fin spacing is assured.

As shown in FIG. 3, the tabs are angularly positioned so that none lies on an "east-west" line through the center of the tube (i.e., a line perpendicular to a radius from the central axis of the heat exchanger out through the center of each tube). Thus, one tab at a first tube does not closely and directly oppose a tab on the same fin at the adjacent tube, which arrangement would interfere with air flow between such tubes and require greater tube spacing for adequate air flow, which in turn would reduce heat exchanging capacity or require a larger unit. The same problem arose with the use of a full collar spacer.

No particular number of tabs is critical, the important criteria being sufficient spaced contact points to assure proper location of the adjacent fin, and minimum total tab circumference. While tab-like formations have been described, it is understood that other space-establishing formations may be employed. It is preferred that such formations be placed at the edge 22 of the holes, to minimize interference with air flow patterns.

This invention may be further developed within the scope of the following claims. Accordingly, the above specification is to be interpreted as illustrative of only a single operative embodiment of this invention, rather than in a strictly limited sense.

I claim:

1. A method for forming a rotating viscous drag air-pumping heat exchanger having a fluid-carrying metal tube passing through a plurality of external sheet metal fins at closely spaced intervals along the length thereof, said tube and fins being formed and assembled by the process which comprises:

(a) forming each fin with (1) a tube-receiving hole so shaped and dimensioned that the radial gap between the outer circumference of the tube and the edge of the hole is minimal and consistent with free insertion of the tube into said hole, and (2) a series of integral narrow formations circumferentially spaced around the periphery of said hole, each formation being dimensioned to locally increase the thickness of the fin as measured along the length of the tube, said thickness being selected and controlled to establish the desired longitudinal spacing between adjacent fins when the formations of one fin abut the adjacent fin, said formations being so configured to prevent them from nesting into formations on an adjacent fin, thereby to assure the desired longitudinal spacing, the number and circumferential width of the formations associated with each hole being selected to provide a combined formation circumference which is a very small proportion of the total hole circumference, the periphery of the hole between the formations being free of any formation which increases the thickness of the fin, so that the major portion of the periphery of the hole presents a sharp edge perpendicular to and in close proximity to the tube;

(b) inserting a tube through the aligned holes of a stack of fins formed in accordance with step (a) above, each fin being pre-spaced from each adjacent fin by the narrow formations thereon, at least one of the opposed surfaces of the fins and tube outer surface being clad with a brazing composition having a melting point below the melting point of both the fin and tube base materials;

(c) brazing the fins and tube into an integral assembly by placing them into a furnace at a temperature above the melting point of said cladding but below the melting point of said base materials, thereby to form a bond between said sharp edge of the fin hole and the tube along substantially the full length of said major portion of the hole periphery.

2. The heat exchanger of claim 1 wherein said formations comprise narrow tabs of generally U-shaped cross section.

* * * * *